Nov. 16, 1971  J. A. NOSLEY  3,620,079

FLUID FLOW MEASURING APPARATUS

Filed Feb. 12, 1969

Inventor
JACQUES A. NOSLEY

By Norman N. Holloway

Attorney 3,620,079
FLUID FLOW MEASURING APPARATUS
Jacques A. Nosley, Gercuit Ste. Ben grue Labry,
Marseille, France
Filed Feb. 12, 1969, Ser. No. 798,692
Claims priority, application France, Feb. 12, 1968,
141,164
Int. Cl. G01p 5/08
U.S. Cl. 73—194 EM                            4 Claims

ABSTRACT OF THE DISCLOSURE

An apparatus for measuring the flow of a conductive fluid in a conduit in which a detector, having an electromagnet in a housing and four electrodes on an insulating wall, is disposed in an aperture in the conduit, with the fluid flowing in the conduit contacting the electrodes. Arrangement is made to dispose the electrodes in the flow of fluid regardless of the size of the detector relative to the conduit diameter.

---

The present invention relates to apparatus for measuring the flow of a conductive fluid, such as water, in a conduit.

It is well known that the rate of flow of an electrically conductive fluid can be determined by measuring the potential induced by the movement of the fluid itself, in a magnetic field. In order to avoid difficulties relating to the conductivity of the fluid, an alternating magnetic field is usually used.

According to the present invention there is provided apparatus for the measurement of flow of a conductive fluid stream, such apparatus comprising a detector including an electromagnet in a housing, said housing having an insulating wall perpendicular to the magnetic axis of the electromagnet, four electrodes on the surface of said insulating wall and disposed in two pairs, the two electrodes of each pair being equidistantly disposed on opposite sides of said magnetic axis, the line joining the two electrodes of one pair being perpendicular to the line joining the two electrodes of the other, electrical leads being connected to each of the electrodes, and the detector housing being sealingly disposed in an aperture in a conduit, so that the electrodes are in communication with the conduit interior.

This arrangement is perfectly satisfactory if the diameter of the conduit is much greater than the spacing between the electrodes. If the diameter is of the same order as this spacing, then a portion of said conduit is of flattened cross-section and the aperture is formed in the flattened portion.

If the diameter of the conduit is much smaller, then according to a further aspect of the invention, there is provided apparatus for the measurement of flow of a conductive fluid stream, such apparatus comprising a detector including an electromagnet in a housing, said housing having an insulating wall perpendicular to the magnetic axis of the electromagnet, four electrodes on the surface of said insulating wall and disposed in two pairs, the two electrodes of each pair being equidistantly disposed on opposite sides of said magnetic axis, the line joining the two electrodes of one pair being perpendicular to the line joining the two electrodes of the other, electrical leads being connected to each of the electrodes, the detector housing being sealingly disposed in a casing having two conduits extending laterally in opposite directions therefrom, and an insert being fitted in the casing, the insert having a recess therein in communication with said conduits and accommodating the electrodes of said detector.

In order that the invention may more readily be understood, the following description is given, merely by way of example, reference being made to the accompanying drawings, in which.

Figure 1:
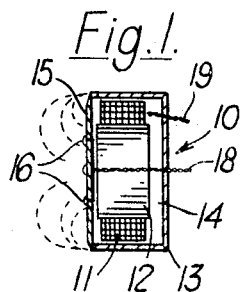
FIG. 1 is a cross-section through the detector of one embodiment of apparatus according to the invention.
Figure 2:
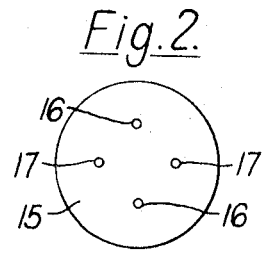
FIG. 2 is an end elevation of the detector of FIG. 1.

Referring first to FIGS. 1 and 2, there is illustrated a detector 10, having windings 11 of an electromagnet wound on a laminated core 12, the whole assembly being located in a short cylindrical housing 13, having an insulating end wall 15. The core 12 is movable in a space 14 within the housing to adjust the impedance of the coil. Located within the insulating wall 15 are two pairs of electrodes 16 and 17, which appear on the external surface of the wall in the form of buttons. The two electrodes 16 are equally spaced from the magnetic axis of the electromagnet, and the electrodes 17 are also equally spaced from this axis. As can be seen from FIG. 2 the line joining the first pair of electrodes 16 is perpendicular to the line joining the second pair of electrodes 17.

The electrodes 16 and 17 are connected in pairs to a measuring instrument (not shown) by a lead 18 having four conductors. In order to supply current to the windings 11, a further lead 19 is provided.

Figure 3:
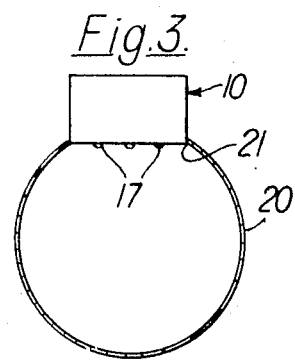
FIG. 3 is a schematic radial cross-section showing one arrangement of fixing the detector in an aperture in a conduit.

When it is desired to fit the detector 10 to a pipe whose diameter is large compared with the spacing between the electrodes 16 or between the electrodes 17, then the detector may simply be fitted in an aperture 21 formed in the conduit 20 (FIG. 3). The wall 15 containing the electrodes 16 and 17 thus effectively forms a part of the wall of the conduit, the electrodes then being in contact or communication with the fluid flowing in the conduits 20.

Figure 4:
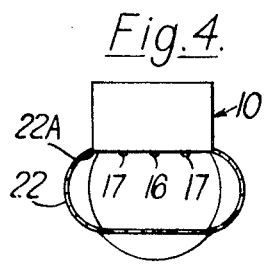
FIG. 4 is a similar view of a second method.
Figure 5:
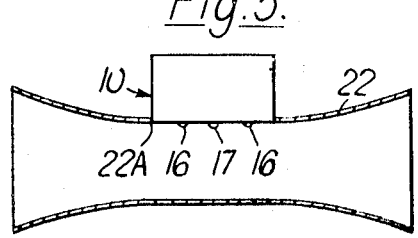
FIG. 5 is an axial cross-section of the conduit of FIG. 4.

Should the pipe have a diameter which is of the same order as the spacing between the electrodes of a pair, then the arrangement illustrated in FIGS. 4 and 5 can be used. The portion of the conduit 22 to which the detector 10 is attached is flattened and the aperture 22A, which accommodates the detector is formed in the flattened portion. This is illustrated clearly in the figures.

Figure 8:
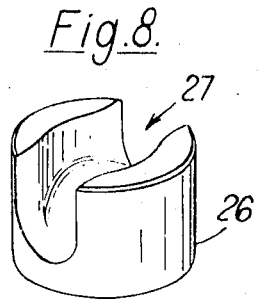
FIG. 8 is a perspective view of the insert in the casing of FIGS. 6 and 7.
Figure 6:
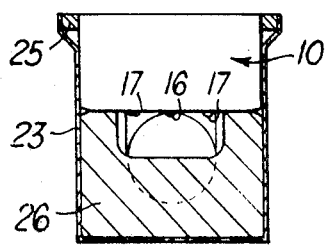
FIG. 6 is a radial cross-section through a casing for associating the detector in a conduit of smaller diameter.
Figure 7:
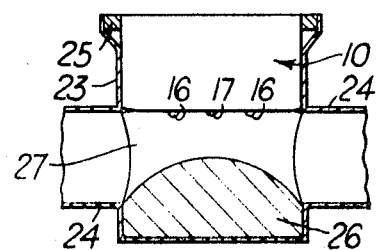
FIG. 7 is an axial section through the casing of FIG. 6.

Should it be desired to use the detector with a pipe whose diameter is substantially less than that of the detector, then the arrangement shown in FIGS. 6 to 8 may be used. A casing 23 is formed with two lateral oppositely etxending stub conduits 24 and a diameter slightly larger than that of the conduit which it is desired to measure the fluid flow. The casing 23 is generally cylindrical and is closed at its lower end, and the detector 10 is a sliding fit in this casing, sealing being effected by an annular sealing ring 25. An insert 26 serves firstly to support the detector 10 in the correct position, and is itself formed with a recess 27, the ends of which are in communication with the stub conduits 24. It will be seen from FIGS. 7 and 8 that the central portion of the recess is shallower than the end portions which are in communication with the stub conduits 24, and is somewhat wider to accommodate the electrodes 16 and 17.

In use of this arrangement, the conduit in which the fluid flow is to be measured, is cut and the conduit is slipped into the stub conduits 24 in a sealing tight manner, so that fluid flows from this conduit, to the stub conduit 24, through a flow path defined by the recess 27 in the insert 26 an insulating wall 15, in contact with the electrodes 16 and 17, and then out through the other stub conduit 24 and so onwardly.

A potential will appear across the pair of electrodes 16, and this can be measured in the measuring instrument, and similarly a second potential will appear across the electrodes 17 and this again can be measured. By suitable vector analysis, which can be carried out by the measuring instrument itself, the actual speed of the fluid in the conduit can be determined. If desired an amplifier may be provided to increase the signals appearing across the pairs of electrodes 16 and 17.

I claim:

1. For the measurement of flow of a conductive fluid stream, apparatus comprising in combination:
   (a) a detector housing;
   (b) an electro-magnet within said housing;
   (c) a magnetic axis to said electromagnet;
   (d) an insulating wall to said housing perpendicular to said axis;
   (e) four electrodes on the surface of said insulating wall and disposed in two pairs, the two electrodes of each pair being equidistantly disposed on opposite sides of said magnetic axis, the line joining the two electrodes of one pair being perpendicular to the line joining the two electrodes of the other pair;
   (f) external leads to each of said electrodes;
   (g) a conduit having a diameter of the same order as the spacing of said pairs of electrodes with a portion of said conduit having a flattened cross-section, and
   (h) means defining an aperture in said flattened portion of said conduit, said detector housing being sealingly disposed in said aperture with said electrodes in communication with the conduit interior.

2. For the measurement of flow of a conductive fluid stream, apparatus comprising in combination:
   (a) a detector housing;
   (b) an electro-magnet within said housing;
   (c) a mangetic axis to said electro-magnet;
   (d) an insulating wall to said housing perpendicular to said axis;
   (e) a pair of electrodes disposed on the surface of said insulating wall on opposite sides of said mangetic axis;
   (f) external leads to each of said electrodes;
   (g) a casing;
   (h) two conduits extending laterally in opposite directions from said casing;
   (i) an insert disposed in said casing; and
   (j) means defining a recess in said insert communicating with said conduits, said detector housing being disposed in said casing such that said insulating wall and said recess define a flow path communicating with said conduits with said electrodes in communication with said flow path.

3. For the measurement of flow of a conductive fluid stream, apparatus comprising in combination:
   (a) a cylindrical detector housing;
   (b) an electro-magnet within said housing;
   (c) a magnetic axis to said electro-magnet;
   (d) an insulating wall to said housing perpendicular to said axis;
   (e) a pair of electrodes disposed on the surface of said insulating wall on opposite sides of said magnetic axis;
   (f) external leads to each of said electrodes;
   (g) a cylindrical casing;
   (h) two conduits extending laterally in opposite directions from said casing, said casing having a diameter larger than that of said conduits;
   (i) an insert disposed in said casing;
   (j) said detector housing being disposed in a sliding fit in said casing and supported by said insert;
   (k) means defining a recess in said insert communicating with said conduits, said detector housing being disposed in said casing with said electrodes in communication with said recess; and
   (l) an annular seal disposed between said detector housing and said casing.

4. For the measurement of flow of a conductive fluid stream, apparatus comprising in combination:
   (a) a detector housing;
   (b) an electro-magnet within said housing;
   (c) a magnetic axis to said electro-magnet;
   (d) an insulating wall to said housing perpendicular to said axis;
   (e) a pair of electrodes disposed on the surface of said insulating wall on opposite sides of said magnetic axis;
   (f) external leads to each of said electrodes;
   (g) a casing;
   (h) two conduits extending laterally in opposite directions from said casing;
   (i) an insert disposed in said casing; and
   (j) means defining a recess in said insert communicating with said conduits, said detector housing being disposed in said casing such that said insulating wall and said recess define a flow path communicating with said conduits with said electrodes in communication with said flow path, said recess being formed with first and second end portions having widths conforming to the diameters of said two conduits, respectively, and being formed with a shallow widened portion therebetween to accommodate said electrodes.

References Cited

UNITED STATES PATENTS

| | | | |
|---|---|---|---|
| 2,515,221 | 7/1950 | Henning | 73—194 X |
| 2,733,604 | 2/1956 | Coulter | 73—194 |
| 3,161,047 | 12/1964 | Griswold | 73—194 X |
| 3,354,717 | 11/1967 | Minnick | 73—204 |
| 3,372,589 | 3/1968 | Mannherz | 73—194 |
| 3,406,569 | 10/1968 | Rohmann | 73—194 |

FOREIGN PATENTS

| | | | |
|---|---|---|---|
| 1,528,050 | 4/1968 | France | 73—194 |

CHARLES A. RUEHL, Primary Examiner